United States Patent [19]

Schlesinger

[11] 4,064,867
[45] Dec. 27, 1977

[54] SOLAR HEAT COLLECTOR

[76] Inventor: Robert J. Schlesinger, 15150 Raymers, Van Nuys, Calif. 91405

[21] Appl. No.: 710,613

[22] Filed: Aug. 2, 1976

[51] Int. Cl.² .......................... F24J 3/02; F24H 7/00; F28F 7/00
[52] U.S. Cl. .................................. 126/271; 126/400; 126/270; 237/1 A; 165/137
[58] Field of Search ................ 126/270, 271, 400; 237/1 A; 165/3, 18, 48, 49, 137

[56] References Cited

U.S. PATENT DOCUMENTS

| | | | |
|---|---|---|---|
| 2,030,350 | 2/1936 | Bremser | 126/271 |
| 2,857,634 | 10/1958 | Garbade et al. | 126/270 |
| 3,060,529 | 10/1962 | Clay | 49/74 X |
| 3,262,493 | 7/1966 | Hervey | 126/271 |
| 3,295,591 | 1/1967 | Thomason | 126/400 X |
| 3,886,998 | 6/1975 | Rowekamp | 126/400 X |
| 3,980,071 | 9/1976 | Barber, Jr. | 126/271 |

Primary Examiner—William F. O'Dea
Assistant Examiner—Larry Jones
Attorney, Agent, or Firm—Thomas H. Jones

[57] ABSTRACT

A solar heat collector having an enclosure, a first receptacle for a heated liquid medium, and a second receptacle for a cooled liquid medium. Heat transfer means within the enclosure provide for the transfer of heat either to or from a liquid medium therein. Additionally, the heating enclosure may include a closure member which is transparent to radiant energy from the sun. Means may be provided to move the closure member between an opened and a closed position in response to the intensity of radiant energy which impinges on the closure member. First means may then be provided to convey a liquid medium from the first receptacle through the heat transfer means and back to the first receptacle with the closure in a closed position. Also, second means may be provided to convey a liquid medium from the second receptacle through the heat transfer means and then back to the second receptacle with the closure member in an opened position. Thus, heat from radiant energy may be transferred to a liquid medium by the heat collector with the radiant energy passing through the closure in its closed position. Also, the collector may function to transfer heat from a liquid medium with the heat being radiated to a darkened sky with the closure in its opened position.

10 Claims, 4 Drawing Figures

SOLAR HEAT COLLECTOR

BACKGROUND OF THE INVENTION

With the increasing scarcity of fossil fuels, greater emphasis is being placed on the use of alternative energy sources. One of the most promising alternative energy sources is solar heating. In solar heating radiation is received from the sun and is used to heat a heat transfer medium. The heated heat transfer medium may then be used to store heat for use on demand, e.g., for heating of the home, for supplying hot water for washing, etc.

In the construction of solar heat collectors, it is known that a heat collector may be made more efficient by insulating the enclosure for the heat collector. Thus, it is known to increase efficiency by placing a transparent closure over the enclosure for the heat collector. Solar energy that is received by the heat collector may, thus, pass through the transparent closure to impinge upon a radiant energy absorbing surface, which may be darkened to enhance the absorption of energy by the surface. A heat transfer medium may then be circulated through a conduit placed within the enclosure with the conduit receiving heat from the energy absorbing surface. For example, the energy absorbing surface may be metallic and the conduit may also be metallic. Then, with the conduit in contact with the energy absorbing surface, the absorption of energy may raise the temperature of the surface to convey heat to the conduit by conductive heat transfer. The liquid heat transfer medium circulating within the conduit may then be heated through contact with the heated conduit walls.

A disadvantage in the use of solar heat collectors has involved the narrow range of their functioning capabilities. Previous solar heat collectors have functioned simply by transferring radiant energy to a heat transfer medium, which is used to store the energy. However, during inclement weather, there may not be sufficient solar radiation available to heat up the heat transfer medium within a reasonable time period. Also, if the day is quite dark, the temperature of the stored heat transfer medium may be so high that it would not be possible to provide a temperature differential within the collector which would permit the transfer of heat to the heat transfer medium. Thus, the heat collector may be completely unusable under these conditions.

In increasing the use of solar radiation as an alternative energy source, it would be desirable to provide a heat collector which is more versatile in operation than present solar heat collectors. By way of example, it would be desirable to provide a heat collector which would have several modes of operation, such as a heating mode on the one hand, and a cooling mode on the other. Such a heat collector could be more efficient since the collector could run substantially continuously with the operation of the collector being more or less independent of the whims of weather.

Such a solar heat collector, could, for example, be operated in its heating mode during bright, clear weather with the collector receiving radiant energy at a relatively high intensity level from the sun. However, on overcast days, or during the night time, the heat collector could be operated in its cooling mode. During operation in its cooling mode, the collector could then be used to remove heat from a liquid heat transfer medium with the heat transfer medium being stored in a container to provide a course of chilled liquid for air conditioning and as a sink for heat rejection for heat pumps and other forms of heat engines requiring low temperatures for efficient heat rejection.

A typical example would be to operate during summer months with the collector in the closed mode during the daytime. The hot water collected would be for domestic use and stored in the "hot" tank. During the night, the collector would operate in the open mode and chill water in a "cold" tank. This chilled water would be used during the following daytime hours to assist in cooling the building by circulating the chilled water through the HVAC duct via a fan coil/heat exchanger.

SUMMARY OF THE INVENTION

In accord with the present invention, I have provided a more efficient solar heat collector which may function to either heat or cool a liquid heat transfer medium. The present solar heat collector is, thus, more efficient than the present heat collectors which function only to heat a transfer medium. The present heat collector, for example, may be operated continuously to function in either its heating mode or its cooling mode depending upon the particular weather conditions.

To function in either heating or cooling a liquid medium, the present heat collector may operate efficiently in a heating mode in transferring heat to a liquid heat transfer medium, or in a cooling mode in removing heat from a liquid heat transfer medium. Thus, the present collectors, in addition to providing a heating enclosure, may also provide a first receptacle for a heated liquid medium and a second receptacle for a cooled liquid medium. Heat transfer means may be positioned within the heating enclosure with the heat transfer means being used to transfer heat to or from a liquid medium which may be circulated through the enclosure.

A closure may then be provided for the heating enclosure with the closure being transparent to radiant energy from the sun. Means may be provided to move the closure to an opened or to a closed position in response to the intensity level of radiant energy which may impinge on the closures. With the closure in its closed position, first means may, then, be provided to convey a liquid heat transfer medium from the first receptacle through the heat transfer means, and then back to the first receptacle. During this operation, the heat collector may operate in its heating mode with radiant energy being transferred in an efficient manner to the liquid heat transfer medium which is circulated through the heat transfer means within the solar heat collector.

With the closure for the heat collector in its opened position, a second means may be provided to convey a liquid medium from the second receptacle through the heat transfer means and then back to the second receptacle. When operating in this manner, the heat collector may operate in its cooling mode. During inclement weather or during the night time when the solar heat collector does not receive radiant energy from the sun, the heat collector may, thus, function to cool a liquid medium by the removal of heat therefrom with the removed heat being radiated to a darkened sky while the closure is in its opened position. When operating in this manner, the heat collector may function as an efficient cooler. Thus, the present heat collector may function in a substantially continuous manner, to function either in its heating mode with solar radiation impinging on the heat collector at a predetermined intensity level, or to function in its cooling mode when there is an absence of radiant energy impinging on the solar heat collector.

Additionally, the present solar heat collector may include a first sensing means to sense the temperature within the enclosure while the closure is in its closed position, and compare this temperature with the temperature in the first receptacle. When the temperature within the the enclosure is at a predetermined level above the temperature within the first receptacle, the first sensing means may then actuate the first means to convey a liquid medium from the first receptacle through the heat transfer means and then back to the first receptacle, i.e., with the collector functioning in its heating mode.

Also, the solar heat collector may include a second sensing means to sense the temperature within the heating enclosure while the closure is in its opened position and to compare the temperature within the enclosure with the temperature within the second receptacle. The second sensing means may then actuate the second means to convey a liquid medium from the second receptacle through the heat transfer means and back to the second receptacle when the temperature within the enclosure is at a predetermined level less than the temperature within the second receptacle, i.e., with the solar heat collector functioning in its cooling mode.

Additionally, the present solar heat collector may include a plurality of closures for the heating enclosure with the closures being transparent to radiant energy from the sun. Means may then be provided to move the closures to an opened or to a closed position in response to the level of radiant energy which impinges on the closures. The closures for the solar heating enclosure may be positioned in spaced relation with respect to each other and the closures may also be movable in unison between an opened and a closed position.

THE DRAWING

To illustrate the invention in terms of a preferred embodiment thereof, reference is made to the accompanying drawing, in which FIG. 1 is a schematic representation of a solar heat collector which may function in either a heating or a cooling mode to transfer heat to a liquid heat transfer medium or to remove heat from a liquid heat transfer medium;

FIG. 2 is a sectional view taken along line 2—2 of FIG. 1 to illustrate the interior of a heating enclosure and the manner in which a plurality of closure members may be moved between an opened and closed position with respect to the heating enclosure;

FIG. 3 is a vertical sectional view, taken opposite to the arrows indicated by the line 2—2 in FIG. 1, which illustrates the heating enclosure with the closure members therefor being moved to an opened position, and FIG. 4 is a sectional view, similar to FIG. 2, which illustrates a further embodiment of the invention in that closure members may be positioned in spaced relation to each other with the closure members being movable in unison between an opened and a closed position.

DETAILED DESCRIPTION

Figure 1:
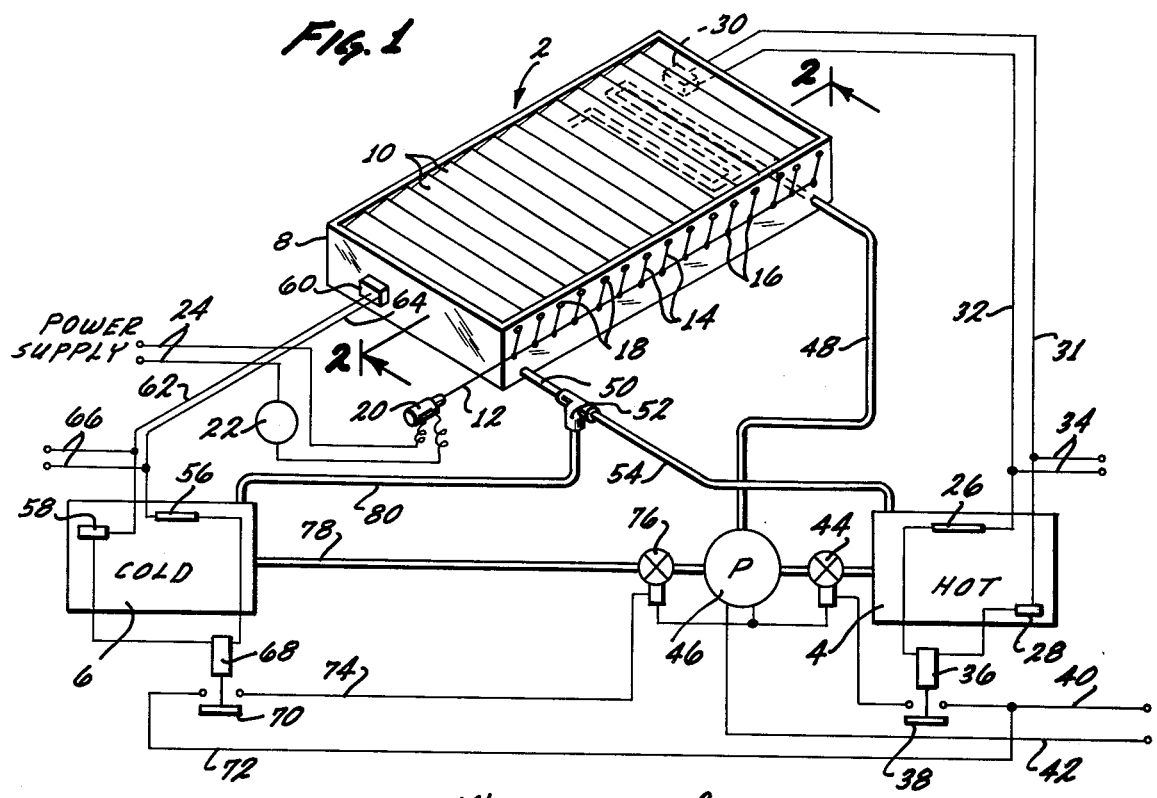

As illustrated in FIG. 1, a solar heat collector 2 may be connected to a hot tank 4 and to a cold tank 6 with the heat collector functioning to heat or cool a liquid heat transfer medium. The heat collector 2 may include a box-like enclosure 8 having a plurality of movable louvers 10 positioned therein to either close or open the upper portion of the enclosure. In controlling the movement of the louvers 10, a movable rod 12 may be connected to a plurality of louver actuators 14 with the louver actuators connected to the rod through a plurality of pivotal connections 16. Each of the louver actuators 14 may, then, be connected to a rotatable shaft 18 having a louver 10 secured thereto such that rotation of the shafts results in either opening or closing of the louvers.

During its operation, as described, the heat collector 2 may function to either heat or to cool a liquid heat transfer medium. When functioning in its heating mode, sunlight may impinge upon the louvers 10 in a closed position, such that the sunlight is transmitted through the louvers into the interior of the box-like enclosure 8. With louvers 10 in a closed position, heat losses from the interior of the enclosure 8 due to convection and radiation are reduced. Accordingly, with the louvers 10 in a closed position, the heating efficiency of the collector 2 is increased.

When the heat collector 2 is in its cooling mode, the louvers 10 are moved to an opened position. This condition may occur, for example, at night such that the interior of the enclosure 8 may lose heat through radiation directly to a dark night sky. To control the position of louvers 10 in response to the operational mode of the heat collector 2, the movable rod 12 may be connected to a solenoid 20 which may be actuated through a solar sensor switch 22 from power supply lines 24. As solar energy is received by the sensor switch 22, it may close to permit the flow of electricity to solenoid 20. The solenoid may, thus, shift the position of the rod 12 to close the louvers 10. Similarly, when the solar sensor switch 22 does not receive solar energy, e.g., on an overcast day or at night, the rod 12 and the louver actuators 14 connected thereto may be positioned to hold the louvers 10 in an opened position such that the interior of the enclosure 8 may lose heat by solar radiation to a dark night sky.

Assuming, for purposes of discussion, that the louvers 10 are in a closed position with solar radiation impinging on the solar sensor switch 22, a differential thermostat 26 may be utilized to control the circulation of a liquid heat transfer medium through the heat collector 2. With the louvers 10 in a closed position the interior of the enclosure 8 may be heated by solar energy which is transmitted to the enclosure through the closed louvers. The differential thermostat 26 may, then sense the temperature of the box-like enclosure 8 as compared with the temperature of the heat transfer medium within the tank 4. This comparison may be accomplished, for example, by placing a temperature sensor 28 within the tank 4 and a sensor 30 within the enclosure 8. The sensors 28 and 30 may be connected to thermostat 26 through wires 30 and 32 which may receive power through power supply lines 34. Then, depending upon the temperature within the enclosure 8, as compared with the temperature within the tank 4, the thermostat 22 may permit the transmission of electricity to the winding of a solenoid switch 36 which may close automatically to move a switch arm 38 to a closed position.

On the movement of the switch arm 38 to a closed position, current may flow from power supply lines 40 and 42 to a power operated valve 44 and to a pump 46. This may then permit the circulation of the liquid heat transfer medium from the tank 4, through the valve 44 and pump 46 to a line 48 which leads to the heat collector 2. After passage through the heat collector 2, the heat transfer liquid may then be discharged from the heat collector through a line 50 which leads to a tee 52 and then to a return line 54.

Similarly, a differential thermostat 56 may function by sensing the difference in temperature between the tank 6 and enclosure 8 by means of a sensor 58 within the cold liquid tank and a sensor 60 positioned within the enclosure. The sensors 58 and 60 may be conneced to differential thermostat 56 through lines 62 and 64 which, in turn, receive power from the power supply lines 66. When the temperature of sensor 60 is at a predetermined level less than the temperature of sensor 58, the differential thermostat 56 may permit the passage of electricity to the coil of a solenoid switch 68 which may produce movement of a switch arm 70 to a closed position. This may then permit the flow of an electrical current through wires 72 and 74 to cause the opening of a power operated valve 76 and the actuation of pump 46. Heat transfer liquid may flow from the cold tank 6 through a line 78, and then through valve 76 and pump 46 to input line 48 to the collector 2. After passage through collector 2, the heat transfer liquid may then flow through output line 50 to the tee 52 and through a return line to the cold tank 6.

As described, the transition of the solar heat collector 2 between its heating and cooling modes may not be instantaneous, since there may be a time lag for heating the enclosure 8 to a temperature higher than that of the interior of tank 4 in going to the heating mode, or, conversely, in cooling the enclosure to a temperature less than that of the tank 6 in going to the cooling mode. Assuming, for example, that sunlight impinges upon the solar sensor switch 22, the louvers 10 may be moved to a closed position through actuation of the rod 12 by solenoid 20. After movement of the louvers 10 to a closed position a certain period of time may be required for heating the enclosure 8 to a temperature which is sufficiently greater than the temperature of tank 4 to produce circulation of the heat transfer liquid from the hot tank through the heat collector 2. With the louvers 10 in a closed position, the temperature level within enclosure 8 may increase to a point where the temperature of the sensor 30 is at a predetermined level above the temperature of sensor 28. At this point, the solenoid switch 36 may close, depending upon the setting of differential thermostat 26, to permit the circulation of heat transfer liquid from the hot tank 4 through the collector 2 and back to the hot tank. The collector 2 may, then, continue to function in its heating mode for so long as the solar sensor 22 receives radiant energy with radiant energy being transmitted through the closed louvers 10 to heat the interior of the enclosure 8.

During night time operation or on an overcast day, the heat collector 2 may operate in its cooling mode. For this to occur, the solar switch 22 may note an absence of radiant energy impinging upon the sensor switch such that the louvers 10 may be moved to an open position—for example, by a return spring associated with the throw rod for the solenoid 20. The enclosure 8 may then be open to the atmosphere to promote the loss of heat from the enclosure through convection and also through direct radiation to the darkened sky. On the initial opening of louvers 10, the temperature within the enclosure 8 may not be sufficiently low to produce the circulation of heat exchange liquid from cold tank 6 through the collector 2. However, as the temperature of enclosure 8 drops, the temperature of the sensor 60 may then fall to a predetermined temperature level less than the temperature of the sensor 58. Then, depending upon the setting of the differential thermostat 56, the solenoid switch 68 may move the switch arm 70 to a closed position to permit circulation of cold heat transfer liquid from the tank 6, through the line 78 and valve, and to the pump 46 to the line 48. After passage of the cold heat transfer liquid through the collector 2, the liquid may then pass through line 50, the tee 52, the return line 80 and back to the cold tank 6. In this manner, the collector 2 may function to cool the heat transfer liquid which is circulated through the collector until such time as the solar sensor switch 22 receives radiant energy of a sufficient level for the louvers 10 to be moved to a closed position, etc., for operation of the collector in its heating mode.

Figure 2:
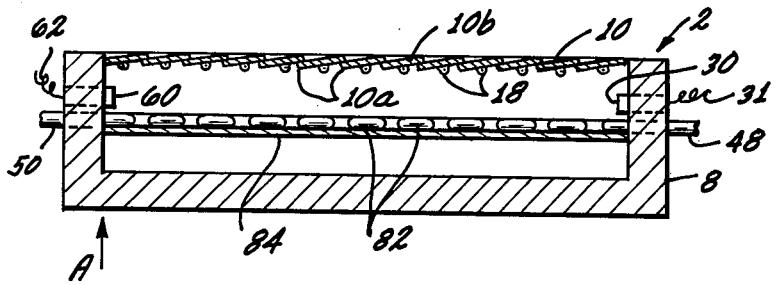

FIG. 2 is a sectional view taken along line 2—2 of FIG. 1, which illustrates the interior of the heat collector 2 in detail. As illustrated, the input line 48 to the collector 2 may lead to a heat exchange tube 82 having a curvilinear configuration which is positioned against a heat absorbent backing material 84. The backing material 84 may, for example, be colored black to increase the absorption of radiant energy by the backing material when the collector 2 is operating in its heating mode. As indicated, with the collector 2 in its heating mode, the louvers 10 are closed such that the trailing end 10a of each louver is in contact with the leading end 10b of the immediately adjacent louver, etc.

In operation, the heat collector 2 will generally be placed in an angled position, as, for example, in positioning the collector on the slanted surface of a roof. When the collector 2 is, thus, positioned, it is preferred that the louvers 10 overlap in a particular manner to reduce heat losses from the collector. Assuming that one end of the heat collector 2 is raised in the direction indicated by the arrow A, the heat flowing in an upward direction along the closed louvers 10 would first flow upwardly over the trailing louver ends 10a, before encountering the leading louver ends 10b. In order for heat to flow between the contacting surfaces of adjacent louvers 10 in being lost from the collector 2, the heat would, thus, have to reverse its direction of flow. Heat which had flowed upwardly in contact with the trailing end 10a would then have to, in effect, turn a corner and flow downwardly in order to pass between the trailing end 10a and the leading end 10b of the adjacent louver 10. Since rising heat would have a tendency to flow in a straight line and not to reverse its flow direction, the position of the trailing and leading louver ends 10a and 10b coupled with the normally angled position of the collector 2 functions to reduce heat loss from the collector.

Figure 3:
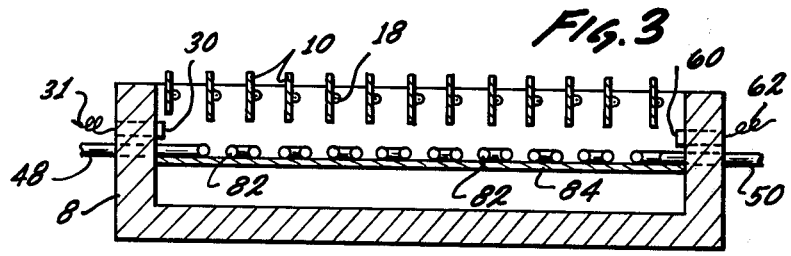

FIG. 3 is a vertical sectional view, in which the the collector 2 is viewed from its opposite side from that of FIG. 2. Thus, the tubes 82 appear as tube pairs in FIG. 3 while the same tubes 82 appear as curved widened portions in FIG. 2 where the individual tubes of each tube pair are connected together. Additionally, as shown in FIG. 3, collector 2 is in its cooling mode with the louvers 10 rotated about their shafts 18 to an opened position. Accordingly, the backing surface 84 may then radiate heat directly to a darkened sky. Further, with opening of the louvers 10, there is no impediment to heat losses from the enclosure 8 by means of thermal convection.

It should be understood that the effect of the louvers 10 in transmitting or blocking the passage of radiant energy, is dependent upon the temperature of the radiant energy source. Thus, radiant energy which is received from the sun may pass through the transparent louvers 10 into the interior of the enclosure 8. However, with the louvers 10 in a closed position, the louvers may not be transparent to radiant energy which is reradiated from the backing surface 84. This result may occur because the backing surface 84 is at a relatively low temperature. Thus, energy radiated from the surface 84 may have a relatively long wave length which may not be transmitted through the material of the louvers 10. Accordingly, the louvers 10 may permit the passage of radiant energy into the solar heat collector 2 from a high temperature source such as the sun, while, at the same time, preventing the loss of heat through the reradiation of energy from the surface 84. In this manner, heat losses from the solar heat collector 2 may be reduced with the collector functioning in a more efficient manner in its heating mode.

Figure 4:
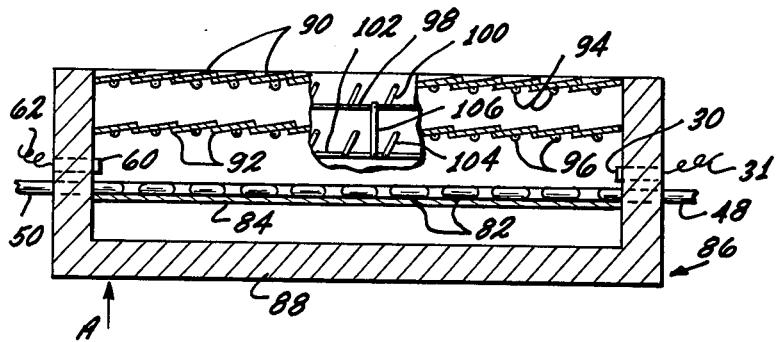

FIG. 4 is an elevational sectional view, similar to FIG. 2, of a further embodiment of a solar heat collector 86. As illustrated, the heat collector 86 is similar in construction to the heat collector 2 shown in FIG. 2. Thus, for ease in description, like elements of the heat collector 86 are referred to by the same reference numerals used in referring to the elements of the heat collector 2.

As illustrated in FIG. 4, the heat collector 86 may include a box-like enclosure 88 having several sets of louvers, such as the louvers 90 and 92, which may be positioned in spaced relation with respect to each other. The louvers 90 may be mounted upon rotatable shafts 94 while the louvers 92 may be mounted upon rotatable shafts 96. A rod 98 having a plurality of louver actuators 100 pivotally connected thereto may then be utilized to rotate the louvers 90 between an opened and a closed position with the louver actuators being connected to the rotatable shafts 94. Likewise, a rod 102 may have a plurality of louver actuators 104 pivotally connected thereto with the louver actuators being connected to the rotatable shafts 96.

In coordinating the movement of the louvers 90 and 92, the rods 98 and 102 may be connected together by a connecting rod 106. The louvers 90 and 92 may, thus, be opened or closed in unison during the transition of the collector 86 from its heating to its cooling mode, or vice versa. Through the use of several sets of louvers, such as the louvers 90 and 92, the effectiveness of the collector 86 in its heating mode may be improved. By using several sets of louvers, such as the louvers 90 and 92, convection heat losses from the enclosure 88 may be further reduced.

I claim:

1. A solar heat collector system comprising:
a solar heating enclosure;
a first receptacle for a heated liquid medium;
a second receptacle for a cooled liquid medium;
heat transfer means within said enclosure for transferring heat to or from a liquid medium;
a closure for said enclosure which closure is transparent to radiant energy from the sun;
first means to convey a liquid medium from said first receptacle through said heat transfer means and then back to said first receptacle when said closure is in a closed position;
second means to convey a liquid medium from said second receptacle through said heat transfer means and then back to said second receptacle when said closure is in an opened position;
said transparent closure being made up of a plurality of closure members, and
means to move said closure members to an opened or a closed position in response to the level of radiant energy which impinges on said closure members.

2. The solar heat collector of claim 1 wherein
said closure members are positioned in spaced relation to each other, and
said closure members are movable in unison between an opened and a closed position.

3. A solar heat collector system comprising;
a solar heating enclosure;
a first receptacle for a heated liquid medium;
a second receptacle for a cooled liquid medium;
heat transfer means within said enclosure for transferring heat to or from a liquid medium;
a closure for said enclosure which is transparent to radiant energy from the sun; p1 means to move said closure to an opened or a closed position in response to the level of radiant energy which impinges on said closure;
first means to convey a liquid medium from said first receptacle through said heat transfer means and then back to said first receptacle when said closure is in a closed position, and
second means to convey a liquid medium from said second receptacle through said heat transfer means and then back to said second receptacle when said closure is in an opened position,
whereby heat may be transferred to a liquid medium from radiant energy passing through the closure with the closure in a closed position while heat may be transferred from a liquid medium and radiated to a darkened sky with the closure in an opened position.

4. The solar heat collector of claim 3 including:
means to sense the temperature within said enclosure with said closure in a closed position;
means to sense the temperature within the first receptacle;
means to compare the difference between the sensed temperature within the first receptacle with the sensed temperature within the enclosure with the closure in a closed position;
means to actuate said first means in response to said temperature difference to convey a liquid medium from the first receptacle through the heat transfer means and back to the first receptacle when the temperature within the enclosure is at a predetermined level above the temperature within said first receptacle;
means to sense the temperature within said enclosure with the closure in an opened position;
means to sense the temperature within the second receptacle;
means to compare the difference between the sensed temperature within the enclosure with the closure in an opened position and the sensed temperature within the second receptacle; and
means to actuate said second means in response to the temperature difference between the temperature within the enclosure with the closure in an opened position and the temperature within the second receptacle to convey a liquid medium from the second receptacle through the heat transfer means and back to the second receptacle when said temperature of the enclosure is at a predetermined level less than the temperature within the second receptacle.

5. The solar heat collector of claim 4 wherein:

said closure is formed of a number of closure members;

portions of adjacent closure members being in overlying relation with said closure in its closed position, and said overlying portions of adjacent closure members forming an opening leading to the contacting area between said portions of adjacent closure members, and said opening being positioned above said contacting area when said heat collector is positioned on an upwardly inclined surface, whereby heat losses from the collector between the overlying portions of adjacent closure members with the heat collector positioned on said upwardly inclined surface is inhibited.

6. The solar heat collector of claim 4 including:

a plurality of closure members forming said enclosure with said closure members being transparent to radiant energy from the sun; and means to move said closure members to an opened or a closed position in response to the level of radiant energy which impinges on said closure members.

7. The solar heat collector of claim 6 wherein said closure members are positioned in spaced relation to each other; and said closure members are movable in unison between an opened and a closed position.

8. The solar heat collector of claim 3 wherein:

said closure is formed of a number of closure members;

portions of adjacent closure members being in overlying relation with said closure in its closed position, and said overlying portions of adjacent closure members forming an opening leading to the contacting area between said portions of adjacent closure members, and said opening being positioned above said contacting area when said heat collector is positioned on an upwardly inclined surface, whereby heat losses from the collector between the overlying portions of adjacent closure members with the heat collector positioned on said upwardly inclined surface is inhibited.

9. The solar heat collector of claim 3 including:

means to sense the temperature within said enclosure with said closure in a closed position;

means to sense the temperature within the first receptacle;

means to compare the difference between the sensed temperature within the enclosure and the sensed temperature within the first receptacle, and means to actuate said first means in response to said temperature difference to convey a liquid medium from the first receptacle through the heat transfer means and back to the first receptacle when the temperature within the enclosure is at a predetermined level above the temperature within the first receptacle.

10. The solar heat collector of claim 3 including:

means to sense the temperature within said enclosure with said closure in an opened position;

means to sense the temperature within the second receptacle;

means to compare the difference between the sensed temperature within the enclosure and the sensed temperature within the second receptacle; and means to actuate said second means in response to said temperature difference to convey a liquid medium from the second receptacle through the heat transfer means and back to the second receptacle when the temperature within the enclosure is at a predetermined level less than the temperature within said second receptacle.

* * * * *